United States Patent [19]
Dubois

[11] Patent Number: 6,082,698
[45] Date of Patent: Jul. 4, 2000

[54] CAPTIVE SOFT FOAM SHOCK MOUNT SYSTEM

[75] Inventor: Neil J. Dubois, Cranston, R.I.

[73] Assignee: The United States of America as represented by the Secretary of the Navy, Washington, D.C.

[21] Appl. No.: 09/090,336

[22] Filed: May 27, 1998

[51] Int. Cl.⁷ ............................. F16M 13/00; F16M 1/00
[52] U.S. Cl. ..................... 248/568; 248/581; 248/638
[58] Field of Search ..................... 248/560, 568, 248/570, 581, 603, 604, 605, 606, 610, 611, 612, 613, 632, 634, 633, 638, 678; 14/73.5

[56] References Cited

U.S. PATENT DOCUMENTS

| | | | |
|---|---|---|---|
| 2,412,838 | 12/1946 | Shores | 248/573 |
| 3,806,975 | 4/1974 | Fyfe | 14/73.5 |
| 4,123,815 | 11/1978 | Neff | 14/73.5 |
| 4,660,682 | 4/1987 | Luinstra et al. | 187/401 |
| 4,976,412 | 12/1990 | Simon et al. | 248/634 |
| 5,005,671 | 4/1991 | Aime et al. | 187/345 |
| 5,121,696 | 6/1992 | Harder | 108/51.3 |
| 5,215,382 | 6/1993 | Kemeny | 384/36 |
| 5,788,206 | 8/1998 | Bunker | 248/634 |

*Primary Examiner*—Ramon O. Ramirez
*Assistant Examiner*—David Heisey
*Attorney, Agent, or Firm*—Michael J. McGowan; James M. Kasischke; Prithvi C. Lall

[57] ABSTRACT

A shock mounting system for use in a housing is disclosed. The shock mounting system includes a shock absorbing base mount member connectable to the housing, a shock absorbing stability mount connectable to the housing, and a mountable component interposed between and secured to each of the base mount member and the stability mount member. The interposition of the mountable component between the shock absorbing base mount member and the shock absorbing stability mount isolates the mountable component from shock due to an external force applied to the housing.

10 Claims, 4 Drawing Sheets

CAPTIVE SOFT FOAM SHOCK MOUNT SYSTEM

CROSS REFERENCE TO RELATED PATENT APPLICATION(S)

The instant application is co-pending with a related patent application entitled CAPTIVE SOFT FOAM SHOCK BASE MOUNT having same filing date.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a mounting system for isolating components in underwater vehicles from shock loading. More particularly, the invention relates to a mounting system in which a base mount and upper stability mounts are used to isolate peak shock loads and limit relative deflection during a shock event.

(2) Description of the Prior Art

Underwater vehicles such as torpedoes have to withstand severe shock load environments. Internal components such as electrical equipment are particularly susceptible. To ensure their survivability, mounts must be designed to isolate the component from the shock loads encountered by the vehicle. Components with a high center of gravity relative to a base mount can encounter large deflections and whipping which can overly strain a base shock mount.

Earlier methods for shock absorption do not address the difficulties identified above and are therefore ineffective in many instances.

The following patents, for example, disclose isolation and shock absorption devices, but do not disclose captivated soft foam layered between interlocking structural supports in a base mount or the use of the base mount and upper stability mounts to both isolate peak shock loads and limit relative deflection during a shock event.

U.S. Pat. No. 4,713,714 to Gatti et al.
U.S. Pat. No. 5,054,251 to Kemeny
U.S. Pat. No. 5,197,707 to Kohan
U.S. Pat. No. 5,215,382 to Kemeny Specifically, the patent to Gatti et al disclose a base shock mount in which first and second brackets 10 and 20 are isolated from one another by vibration isolators 50. Bracket 10 attaches to a foundation and bracket 20 attaches to a component 1. The brackets are similarly shaped to nest in one another but do not interlock.

The patent to Kemeny '251 discloses a base shock mount in which first and second brackets 16 and 20 are isolated from one another by an elastomer layer 28. Bracket 16 attaches to a foundation and bracket 20 attaches to a column 12. The brackets are correspondingly shaped to mesh but do not interlock over plural layers.

Kohan discloses a vibration isolation platform in which a vibration absorption medium is interposed between all opposing faces of plinth 102 and base 106 although the plinth and base are not interlocked.

Kemeny '382 discloses an isolation bearing in which rigid brackets are simply isolated from one another with an elastomer that includes polyurethane.

It should be understood that the present invention would in fact enhance the functionality of the above patents by increasing the shock absorption capabilities with a simplified and structurally sound device.

SUMMARY OF THE INVENTION

Therefore it is an object of this invention to provide a shock mounting system which includes a base mount and upper stability mounts.

Another object of this invention is to provide a shock mounting system in which interlocking components of the base mount are separated by soft shock absorbing foam.

Still another object of this invention is to provide a shock mounting system in which components of the upper stability mounts are separated by soft shock absorbing foam.

A still further object of the invention is to provide a shock mounting system which will withstand high impact and repeated use and still maintain its strength and flexibility.

Yet another object of this invention is to provide a shock mounting system which is simple to manufacture and easy to use.

In accordance with one aspect of this invention, there is provided a shock mounting system for use in a shell type housing. The shock mounting system includes a shock absorbing base mount member connectable to the housing, a shock absorbing stability mount connectable to the housing, and a mountable component interposed between and secured to each of the base mount member and the stability mount member. The interposition of the mountable component between the shock absorbing base mount member and the shock absorbing stability mount isolates the mountable component from shock due to an external force applied to the housing.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
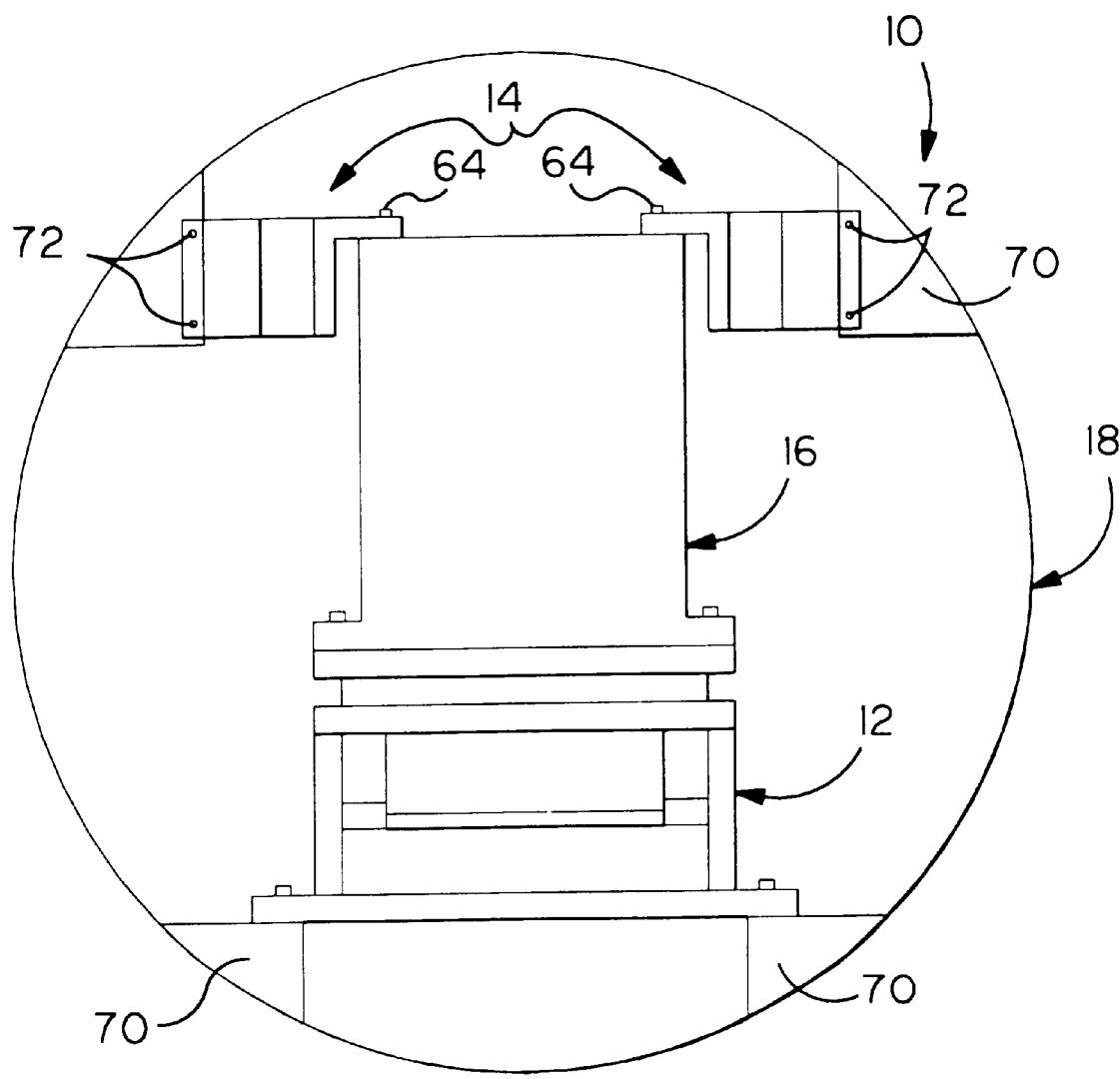
FIG. 1 is a front view of a captive soft foam shock mounting system according to a first preferred embodiment of the present invention.
Figure 2:
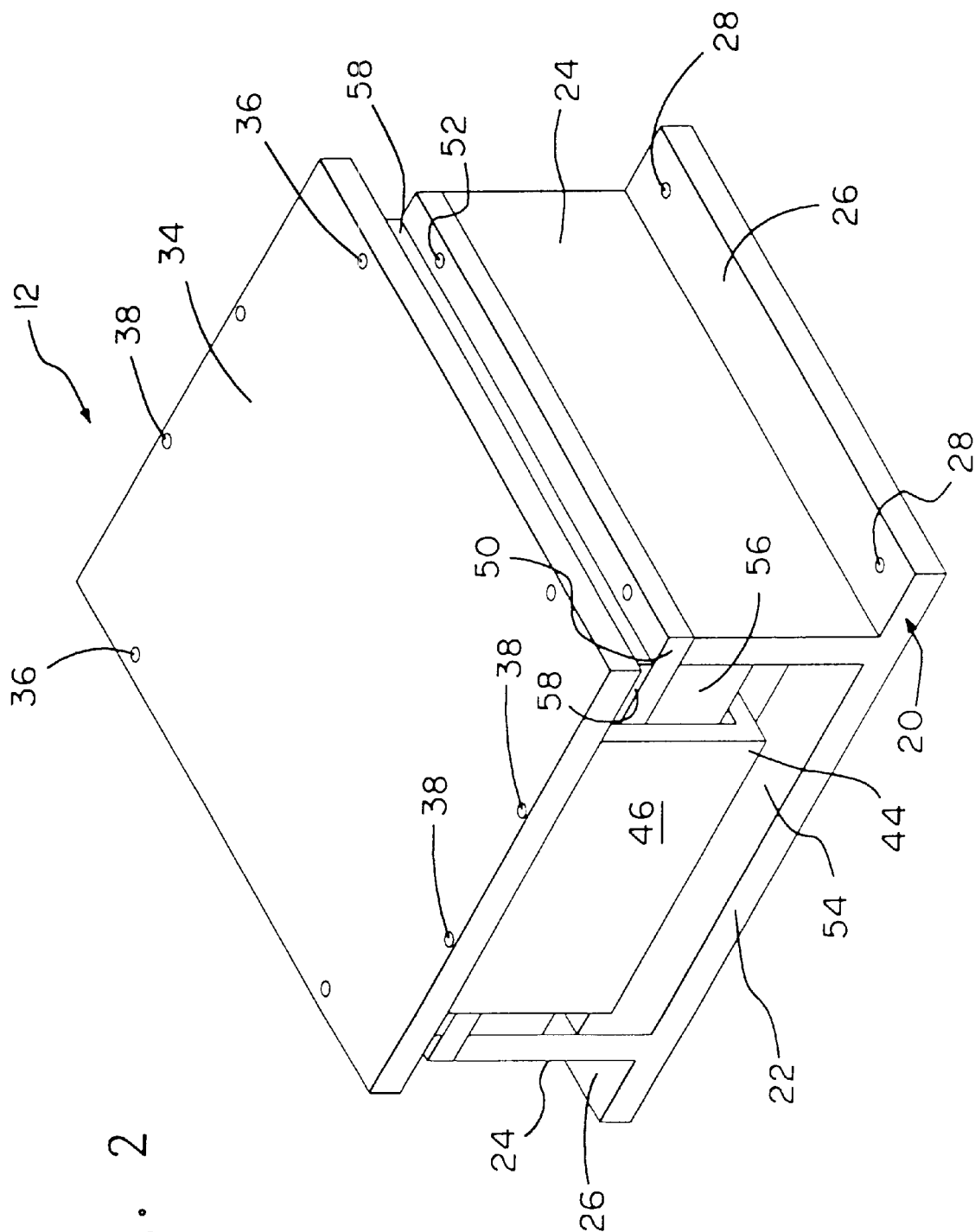
FIG. 2 is a front perspective view of a shock base mount for use with the present invention.

In general, the present invention is directed to a shock mounting system 10 as shown in FIG. 1. The system 10 will be described and illustrated in connection with component mounting in underwater vehicles, however, it will be understood that the system is applicable to numerous other environments.

Referring now to FIG. 1, the mounting system 10 includes a base mount member 12 and two stability mounts 14. The combination of the base mount member 12 and the pair of stability mounts 14 support a component 16, such as an electrical component, inside of a cylindrical shell 18 typical of the way the system would be used in an underwater vehicle. The use of both the base mount 12 and the stability mounts 14 provide both the shock isolation required to protect the component 16 and prevent excessive relative motion between the shell 18 and the component 16. Additionally shown in FIG. 1 are mounting flanges 70 as an internal extension of the cylindrical shell 18. The stability mounts 14 include apertures 72 formed therein, and the stability mounts are connected to the mounting flanges 70 by bolts 64 or the like inserted into the apertures 72 of the stability mount 14. Thus, the stability mount 14 is securely fastened to the mounting flanges of the cylindrical shell 18.

Figure 3:
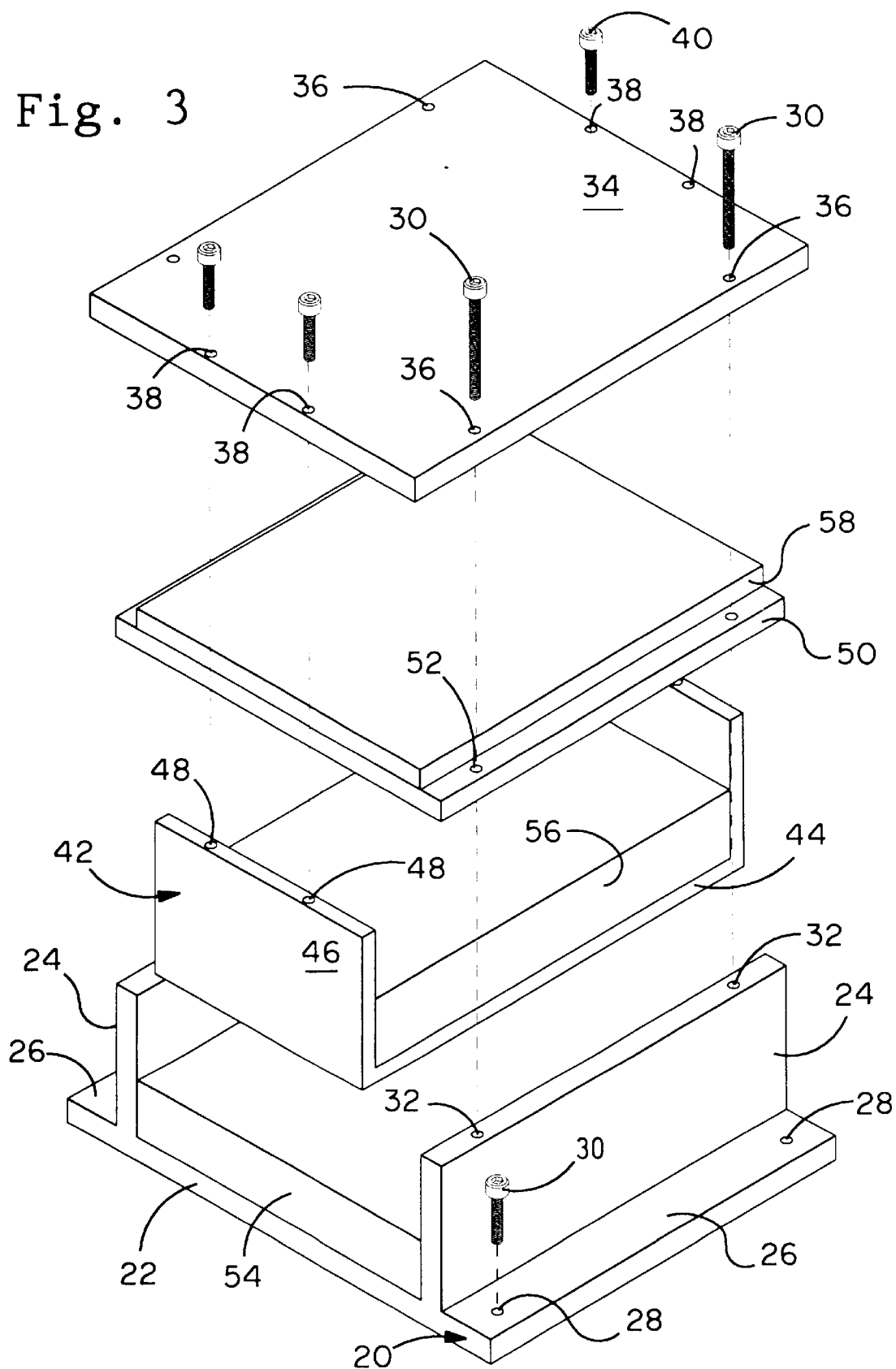
FIG. 3 is an exploded perspective view of the shock base mount shown in FIG. 2.
Figure 4:
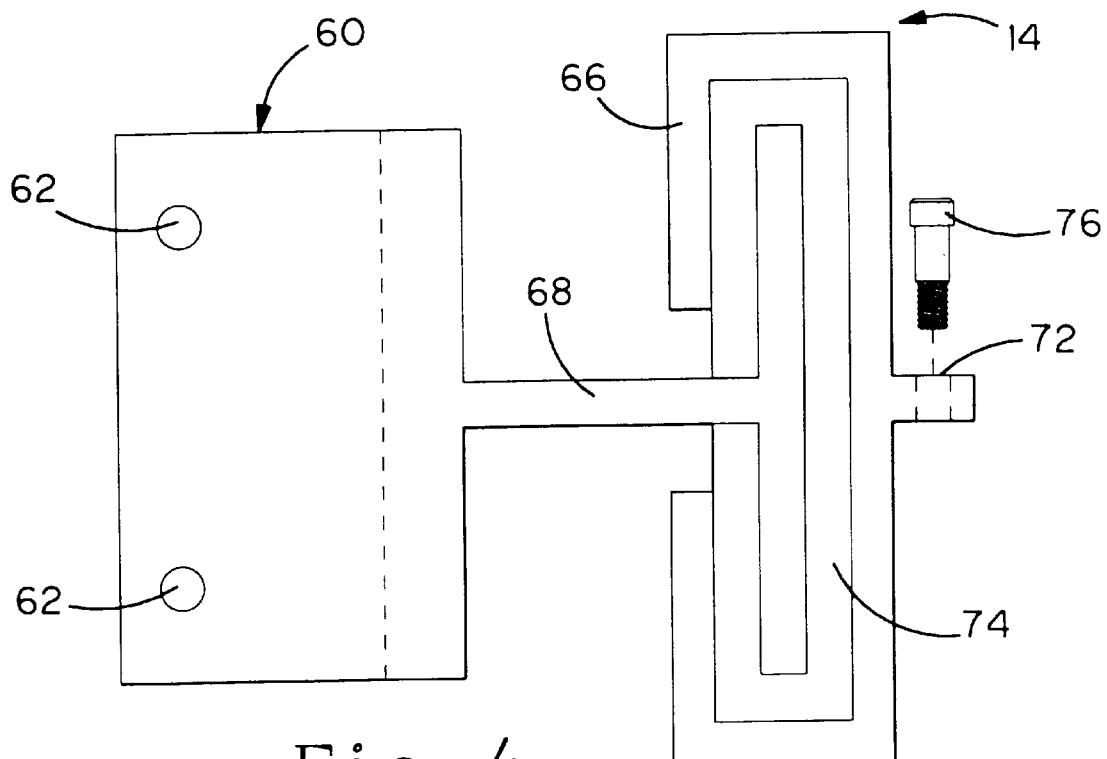
FIG. 4 is a top plan view of the stability mount shown in FIG. 1.

Turning now to FIGS. 3 and 4, the base mount 12 will be described in further detail. In particular, the base mount 12 is a shock absorbing device including several interlocking structural elements. A base mount bracket 20 serves as one of the structural elements of the shock absorbing device 12 and includes a planar base plate 22 and a pair of bottom mounting plates 24 extending perpendicularly from a corresponding face of the planar base plate 22. The pair of bottom mounting plates 24 are set in from opposing edges of the planar base plate 22 by a predetermined distance, thereby forming base plate extensions 26 beyond an outer face of each of the bottom mounting plates 24. There are at least two apertures 28 formed in each of the base plate extensions 26. The at least two apertures 28 are used for receiving bolts 30 or the like therein for securing the base mount bracket 20 to an external device as shown in FIG. 1. In addition, there are at least two apertures 32 formed in minor exposed edges of the bottom mounting plates 24 for connection to an interconnecting plate which will be described below.

The bottom mounting plates 24 as described, are integrally formed with the planar base plate 22 and may either be a one-piece construction or separately formed and connected together in a manner suitable to the end use of the device. In other words, a factor in determining the assembly of the planar base plate 22 with the bottom mounting plates 24 will include the end use of the shock absorbing device and the force of the load to be applied thereto.

A top mounting plate 34 opposes the base mount bracket 20 and is planar in appearance. Specifically, the top mounting plate 34 includes a first plurality of apertures 36 for receiving the bolts 30 or the like therein for securing the top mounting plate 34 to an external device as shown in FIG. 1. A second plurality of apertures 38 are provided in the top mounting plate 34 for securing the top mounting plate 34 to interconnecting plates as will be further described below. Again, bolts 40 or the like will be used for securing these components together.

As more clearly shown in FIG. 3, there are two intermediate or interconnecting mounting plates utilized in the shock absorbing device 12. In particular, a U-shaped interconnecting plate 42 includes a base portion 44 and side walls 46 projecting in a perpendicular orientation from a corresponding face of the base portion 44 at opposing ends thereof, thereby forming the U-shaped interconnecting plate 42. A pair of apertures 48 are formed in each of the minor exposed edges of the side walls 46. The pair of apertures 48 in each side wall 46 are aligned with the apertures 38 in the planar top mounting plate 34 as shown in FIG. 4.

Another intermediate mounting plate is shown as planar interconnecting plate 50. The planar interconnecting plate 50 includes at least pair of apertures 52 formed in opposing ends thereof and adjacent the edge of the planar interconnecting plate 50. Upon assembly, the apertures 32 of the bottom mounting plates 24 will be aligned with the apertures 52 of the planar interconnecting plate 50. Likewise, the apertures 48 of the side walls 46 of the U-shaped interconnecting plate 42 are aligned with the apertures 38 of the top mounting plate 34.

At least three layers of soft foam are interposed between the mounting plates as follows and consequently "captivated" therein as a result of the interlocking nature of the plates. A first foam layer 54 is seated on planar base plate 22 between the bottom mounting plates 24 of the base mount bracket 20. A second foam layer 56 is seated on base portion 44 between the side walls 46 of the U-shaped interconnecting plate 42. A third foam layer 58 is seated on the surface of the planar interconnecting plate 50 as shown, but does not extend over an entire surface of the planar interconnecting plate 50. The third foam layer 58 is of a size to allow the apertures 52 of the planar interconnecting plate 50 to remain exposed for connection purposes in a preferred embodiment of the invention. The layers of foam are each applied to respective plates or brackets by the use of a standard pressure sensitive adhesive (not shown) prior to assembly of the complete mount.

Upon assembly, the layers of the shock absorbing device 12 are as follows. The base mount bracket 20 including the first foam layer 54 therein receives the U-shaped interconnecting plate 42 thereon so that the base 44 of the U-shaped interconnecting plate is located between the first foam layer 54 and the second foam layer 56. Next, the planar interconnecting plate 50 having the third foam layer 58 thereon is positioned between the second foam layer 56 on the U-shaped interconnecting plate 42 and the third foam layer 58. Finally, the top mounting plate 34 is positioned above the third foam layer 58 seated on the planar interconnecting plate 50. With the side walls 46 of the U-shaped interconnecting plate 42 turned at 90 degrees to the bottom mounting plates 24 of the base mount bracket 20, the ends of the planar interconnecting plate 50 are aligned with the apertures 32 of the bottom mounting plates 24, and the apertures 38 of the top mounting plate 34 are aligned with the apertures 48 in the side walls 46 of the U-shaped bracket 42. This interconnection in combination with the foam layers provides an interlocking arrangement of structural plates having soft foam shock absorbing material interposed therebetween.

Stated another way, assembly of the base mount member 12 will be such that a base portion thereof includes the base mount bracket 20 secured to the planar interconnecting plate 50, while an upper portion thereof includes the U-shaped interconnecting bracket 42 secured to the top mounting plate 34. Once assembled, the brackets 20 and 34 cannot be separated from each other due to a mechanical interference or load applied to the base mount member 12. Between the brackets 20 and 34, are the layers 54, 56, and 58 of soft foam. In the preferred embodiment, these layers of foam are a microcellular urethane foam such as PORON, presently manufactured by the Rogers Corporation. Such a foam possesses excellent damping properties as well as excellent proven shock absorption qualities. By including the soft foam between the interlocked plates of brackets 20 and 34, the foam becomes "captive". During a shock load oriented perpendicular to the planar base plate 22 and top mounting plate 34 in FIG. 3, the brackets would move in opposition to each other in a wavelike fashion. This cyclic motion would be opposed by compression in one of the soft foam layers, the layer alternating with the direction of cyclic motion. Thus, throughout the deflection encountered during the shock event, at least one layer of foam is in compression. These soft foams when used in large compression areas can support great loads.

By the use of soft foam material in compression through the loading cycle, shock absorption is maximized while still maintaining deflection limits. The interconnecting plate design limits the deflection attainable to the thickness of the foam layers. The interconnecting plate design also provides a failsafe mechanism. The mechanical interference eliminates the possibility of a failure in the absorption material allowing the mounting component to fly off.

It is intended that the material used for the brackets and plates is made of aluminum, however the brackets could be made of other materials if the loading required greater or lesser strength. Likewise, material substitutions specific to the environmental conditions can be easily accomplished, for example using a silicone foam material in the case of low temperature operation.

Figure 5:
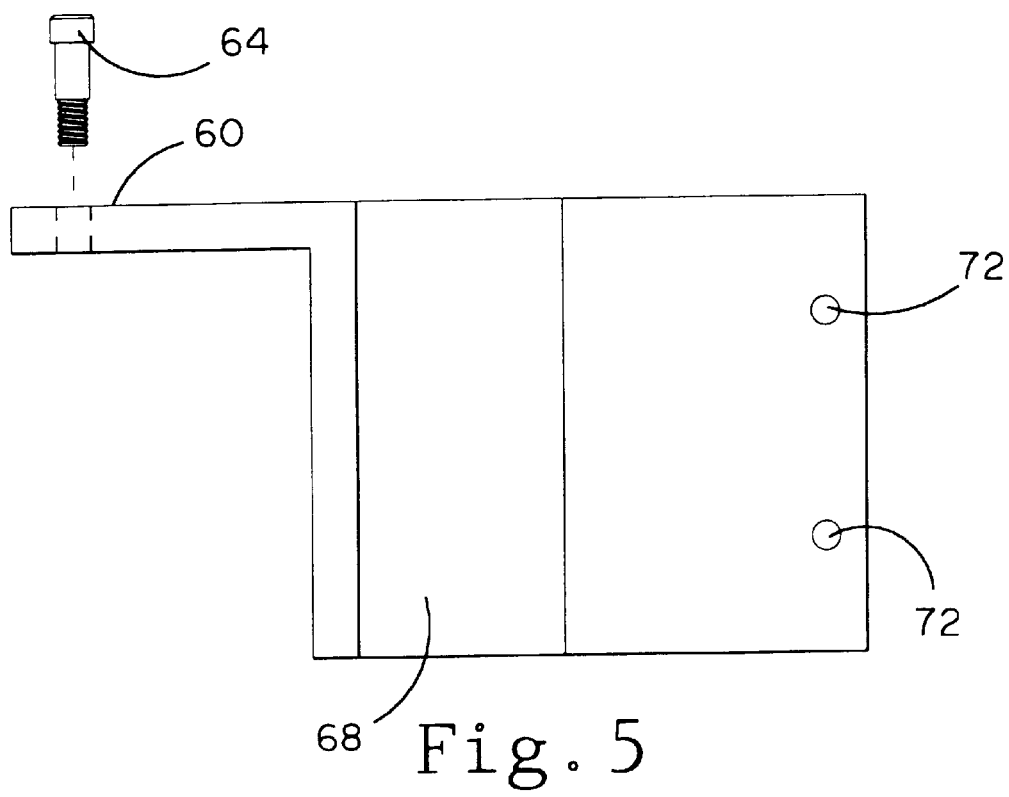
FIG. 5 is a side view of the stability mount shown in FIG. 1.

Referring now to FIGS. 4 and 5, the stability mount 14 will be explained in further detail. Specifically, the stability mount 14 includes essentially three parts. First, a component mounting flange 60 serves to connect the component 16 to the cylindrical shell 18 by a bolted connection. The component mounting flange 60 has at least a pair of apertures 62 formed therein adjacent an outer edge thereof. Bolts 64 or the like are used to physically connect the component mounting flange 60 to the component 16 as shown. An elongated T-shaped bracket 68 is integrally connected to and extends away from the component mounting flange 60. Further, a foundation bracket 66 is connectable to a mounting flange 70 on an inner peripheral surface of the cylindrical shell 18 and surrounds the "T" portion of the T-shaped bracket 68 in such a manner that a gap is formed between the foundation bracket 66 and around an entirety of the "T" portion of the T-shaped bracket 68. A layer of soft foam material 74 is provided to fill the gap described. The layer of soft foam material is preferably a microcellular urethane such as PORON, manufactured by Rogers Corporation. The foam layer 74 is attached to the "T" of the T-shaped bracket 68 and the foundation bracket 66 by means of any suitable adhesive, such as toughened cyanoacrylate, thereby forming a cohesive stability mount 14.

The foundation bracket 66 additionally includes at least a pair of apertures 72 formed therein through which bolts 76 or the like are inserted to connect to the mounting flanges 70 of the cylindrical shell 18.

The component mounting flange 60 and the foundation bracket 66 are preferably formed of aluminum, although the material may be altered to suit a particular need for strength or flexibility.

An advantage of the invention is the ability to provide stability for shock mounted structures while also providing a high degree of isolation for the mounted component 16 from the shock loading. Additionally the unique "T" geometry of the stability mount 14 captures the isolating foam layer 74 between the "T" of the T-shaped bracket 68 and the foundation bracket 66, creating a compression force in the one side of the foam throughout the loading cycle. The "T" section also provides additional safety in case of mechanical failure in the elastomer layer 74, with the mechanical interference preventing the mounted component 16 from separating. As a system, the invention provides stable shock isolation mounting for a wide range of components in a variety of environments.

By the present invention, shock absorption is conducted in a more efficient manner than previously achieved in the art, and components can withstand greater impact loads as a result of the shock absorption capabilities of the device.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A shock mounting assembly comprising:
   a housing;
   a component for mounting to said housing;
   a shock absorbing base mount member connectable to said housing, said shock absorbing base mount member including a base portion connected to said housing, an upper portion having a continuous upper surface connected directly to said component, and a plurality of shock absorbing material layers interposed only between the base portion and the upper portion; and
   at least one shock absorbing stability mount connectable to said housing;
   said component being interposed between and secured to each of said base mount member and said stability mount member, wherein the interposition of said component between said shock absorbing base mount member and said shock absorbing stability mount isolates said mountable component from an external force applied to said housing;
   wherein said shock absorbing base mount member base portion comprises:
      a substantially U-shaped base mount bracket having upper exposed ends; and
      a planar interconnecting plate connected to upper exposed ends of the U-shaped base mount bracket; and
   said shock absorbing base mount member upper portion comprises:
      a U-shaped interconnecting plate having upper exposed ends;
      a top mounting plate connected to upper exposed ends of the U-shaped interconnecting plate such that the planar interconnecting plate is interposed between the U-shaped interconnecting plate and the top mounting plate and a base of the U-shaped interconnecting plate is interposed between the substantially U-shaped base mount bracket and the planar interconnecting plate; and
      the plurality of shock absorbing material layers are interposed between the substantially U-shaped base mount bracket and the U-shaped interconnecting plate, the U-shaped interconnecting plate and the planar interconnecting plate, and the planar interconnecting plate and the top mounting plate.

2. The assembly according to claim 1 wherein said at least one shock absorbing stability mount includes:
   a component mounting flange connectable to the component;
   a T-shaped bracket having a T portion extending away from the component mounting flange;
   a foundation bracket surrounding the T portion of the T-shaped bracket and connectable to said housing; and
   a shock absorbing material interposed between the T portion of the T-shaped bracket and the surrounding foundation bracket.

3. The assembly according to claim 1 further comprising a plurality of mounting flanges joined with said base mount member and said at least one stability mount member for connecting to said housing.

4. The assembly according to claim 3 further comprising means for securing each of said base mount member and said at least one stability mount member to a corresponding one of said plurality of mounting flanges.

5. A shock mounting system for mounting a component to a housing comprising:
   a shock absorbing base mount member connectable to said housing, said shock absorbing base mount member including:
      a base portion connectable to said housing, wherein the base portion includes a substantially U-shaped base mount bracket, and a planar interconnecting plate connected to upper exposed ends of the U-shaped base mount bracket;
      an upper portion connectable to said mountable component, wherein the upper portion includes a U-shaped interconnecting plate, and a top mounting plate connected to upper exposed ends of the U-shaped interconnecting plate such that the planar interconnecting plate is interposed between the U-shaped interconnecting plate and the top mounting plate and a base of the U-shaped interconnecting plate is interposed between the substantially U-shaped base mount bracket and the planar interconnecting plate;
      a plurality of shock absorbing material layers interposed between the substantially U-shaped base mount bracket and the U-shaped interconnecting plate, the U-shaped interconnecting plate and the planar interconnecting plate, and the planar interconnecting plate and the top mounting plate; and
   at least one shock absorbing stability mount connectable to said housing;
   said base mount member and said stability mount member being capable of securing said component therebetween for isolating said component from an external force applied to said housing.

6. The system according to claim 5 wherein said at least one shock absorbing stability mount includes:

a component mounting flange connectable to the component;
   a T-shaped bracket extending away from the component mounting flange;
   a foundation bracket surrounding a T portion of the T-shaped bracket and connectable to said housing; and
   a shock absorbing material interposed between the T portion of the T-shaped bracket and the surrounding foundation bracket.

7. The system according to claim 6 further comprising a plurality of mounting flanges joined with said base mount member and said at least one stability mount member for connecting to said housing.

8. The system according to claim 7 further comprising means for securing said base mount member and said at least one stability mount member to a corresponding one of said plurality of mounting flanges.

9. The system according to claim 5 wherein said at least one shock absorbing stability mount includes:
   a component mounting flange removably connectable to the component;
   a T-shaped bracket extending away from the component mounting flange;
   a foundation bracket surrounding a T portion of the T-shaped bracket and removably connectable to said housing; and
   a shock absorbing material interposed between the T portion of the T-shaped bracket and the surrounding foundation bracket.

10. The system according to claim 9 further comprising:
   a plurality of mounting flanges joined with said base mount member and said at least one stability mount member for connecting to said housing; and
   a means for securing said base mount member and said at least one stability mount member to a corresponding one of said plurality of mounting flanges.

* * * * *